US011346457B2

(12) United States Patent
Dohi et al.

(10) Patent No.: US 11,346,457 B2
(45) Date of Patent: May 31, 2022

(54) PIEZOELECTRIC DRIVEN VALVE, PRESSURE-TYPE FLOW RATE CONTROL DEVICE, AND VAPORIZATION SUPPLY DEVICE

(71) Applicant: FUJIKIN INCORPORATED, Osaka (JP)

(72) Inventors: Ryousuke Dohi, Osaka (JP); Kaoru Hirata, Osaka (JP); Katsuyuki Sugita, Osaka (JP); Koji Kawada, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/161,219

(22) Filed: Jan. 28, 2021

(65) Prior Publication Data

US 2021/0239230 A1  Aug. 5, 2021

(30) Foreign Application Priority Data

Jan. 30, 2020   (JP) .............................. JP2020-013150

(51) Int. Cl.
*F16K 31/00* (2006.01)
*F16K 41/02* (2006.01)
*G05D 7/06* (2006.01)

(52) U.S. Cl.
CPC .......... *F16K 31/007* (2013.01); *F16K 31/004* (2013.01); *F16K 41/023* (2013.01); *G05D 7/0647* (2013.01)

(58) Field of Classification Search
CPC .... F16K 31/007; F16K 31/004; F16K 31/008; F16K 41/023; F16K 51/02; F16K 99/0048; G05D 7/0647; Y10T 137/87917; Y10T 29/42; H01L 41/083; H01L 41/23
See application file for complete search history.

(56) References Cited

U.S. PATENT DOCUMENTS

| 5,455,477 A * | 10/1995 | Sano ..................... H01L 41/083 310/328 |
| 7,990,023 B2 * | 8/2011 | De Paoli ............... H01L 41/083 310/328 |
| 8,162,286 B2 * | 4/2012 | Sawada ................. F16K 31/007 251/129.06 |

(Continued)

FOREIGN PATENT DOCUMENTS

| JP | 2003120832 A | 4/2003 |
| JP | 2005149075 A | 6/2005 |

(Continued)

*Primary Examiner* — Craig J Price
*Assistant Examiner* — Andrew J Rost
(74) *Attorney, Agent, or Firm* — Studebaker & Brackett PC

(57) ABSTRACT

A piezoelectric element-driven valve 1 including a main body, a valve element, piezoelectric actuators, a plurality of cylindrical actuator boxes arranged in series, a cylindrical outer connecting jig detachably connecting the adjacent actuator boxes and having an opening for drawing out wiring, a plurality of piezoelectric actuators accommodated in the actuator box respectively in the same direction, and a cylindrical inner connecting jig slidably accommodated in the outer connecting jig and having an opening for positioning the adjacent piezoelectric actuators and drawing out wiring.

10 Claims, 10 Drawing Sheets

(56) References Cited

U.S. PATENT DOCUMENTS

| | | | |
|---|---|---|---|
| 8,181,932 B2* | 5/2012 | Matsumoto | F16K 7/14 |
| | | | 251/129.06 |
| 9,625,047 B2* | 4/2017 | Hirose | F16K 25/005 |
| 10,174,858 B2* | 1/2019 | Hirata | G05D 7/0635 |
| 2010/0127196 A1 | 5/2010 | Sawada et al. | |
| 2011/0100483 A1 | 5/2011 | Nagata et al. | |
| 2011/0284779 A1* | 11/2011 | Cewers | F16K 31/007 |
| | | | 251/118 |
| 2015/0322567 A1* | 11/2015 | Hidaka | F22B 1/285 |
| | | | 392/400 |
| 2017/0254430 A1 | 9/2017 | Hirata et al. | |
| 2018/0216751 A1* | 8/2018 | King | F16K 37/0033 |
| 2020/0018413 A1 | 1/2020 | Dohi et al. | |
| 2020/0199753 A1 | 6/2020 | Hidaka et al. | |
| 2020/0348704 A1 | 11/2020 | Sugita et al. | |

FOREIGN PATENT DOCUMENTS

| | | |
|---|---|---|
| JP | 2008249002 A | 10/2008 |
| JP | 2009252760 A | 10/2009 |
| JP | 2010180429 A | 8/2010 |
| JP | 2016050645 A | 4/2016 |
| JP | WO2018123852 A1 | 10/2019 |
| JP | WO2019021949 A1 | 6/2020 |
| JP | WO2019107215 A1 | 11/2020 |

\* cited by examiner

PIEZOELECTRIC DRIVEN VALVE, PRESSURE-TYPE FLOW RATE CONTROL DEVICE, AND VAPORIZATION SUPPLY DEVICE

TECHNICAL FIELD

The present invention relates to an improvement of a piezoelectric element driven valve for controlling the flow rate of a fluid, a pressure type flow rate control device, and a vaporization supply apparatus used in a semiconductor manufacturing facility or a chemical plant, or the like, in particular, relates to a piezoelectric element driven valve having piezoelectric actuators arranged in series to increase the stroke of the valve element so that a large flow rate can be obtained, a pressure type flow rate control device including the piezoelectric element driven valve, and a vaporization supply apparatus including the pressure type flow rate control device.

BACKGROUND ART

Generally, in a semiconductor manufacturing facility or a chemical plant or the like, to control the flow rate of a material gas or an etching gas, several types of flow rate control devices are used. For example, there is a pressure type flow rate control device capable of controlling the mass flow rate of various fluids with high accuracy by a relatively simple mechanism combining a piezoelectric element driven valve and a restriction portion (orifice plate or critical nozzle, sound velocity nozzle). (For example, see Patent Documents 1-5 below)

Further, in a semiconductor manufacturing facility that forms a film by the organometallic vapor-phase epitaxy method, a vaporization supply apparatus is used to supply a raw material gas to a process chamber. For example, the vaporization supply apparatus includes a vaporization unit for heating and vaporizing a liquid raw material and a pressure type flow rate control device for controlling the flow rate of gas sent from the vaporization unit (for example, see Patent Document 6-8 below).

As for the piezoelectric element driven valve used in the pressure type flow rate control device, one is known as configured to open and close the metal diaphragm valve element by a piezoelectric actuator (e.g., see Patent Documents 1 to 5 below).

The piezoelectric actuator used in the piezoelectric element driven valve accommodates the stacked piezoelectric element in a sealed metal-made casing formed in a cylindrical shape. Although the piezoelectric actuator has a large thrust and excellent in responsiveness and control characteristics, there is a problem that the displacement amount of the piezoelectric element is very small, and the stroke cannot be increased. Thus, there is a problem that a large flow rate cannot be obtained in the pressure type flow rate control device provided with the piezoelectric element driven valve, and the vaporization supply apparatus provided with the pressure type flow rate control device.

In addition, by elongating the piezoelectric actuator, it is possible to increase the stroke. However, as for the piezoelectric actuator of stacked piezoelectric element, if the piezoelectric element is elongated, the entire piezoelectric element may warp. Then, it is impossible to produce a long piezoelectric actuator with good accuracy. Further, if the piezoelectric element is elongated, the piezoelectric element becomes weak against the external force from the lateral direction (direction perpendicular to the axis). Then, there is a problem that the piezoelectric element is easily damaged by impact from the lateral direction. Furthermore, a problem of difficult development and durability test of the piezoelectric element or the like occurs.

On the other hand, as to the piezoelectric element driven valve used in the pressure type flow rate control device, a piezoelectric element driven valve has been developed so as to increase the stroke of the valve element and obtain a large flow rate by arranging two piezoelectric actuators in series (e.g., see Patent Document 9).

That is, the piezoelectric element driven valve 50, as shown in FIG. 12, is configured as a normally closed piezoelectric element driven valve 50, which is incorporated in a pressure type flow rate control device installed in a fluid supply line of a semiconductor manufacturing facility, and includes: a main body 51 having a fluid passage 51*a* and a valve seat 51*b*, a metal diaphragm valve element 52, a hold adapter 53, a split base 54, a base holder 55, an actuator box 56 (having a first cylindrical portion 56A, a second cylindrical portion 56B and a cylindrical connecting body 56C) and a diaphragm holder 57, an elastic element 58, a lower support 59, two piezoelectric actuators 60 and 60 arranged in upper and lower stages, a cylindrical spacer 61, a upper support 62, a thrust bearing 63, an adjusting cap nut 64, and a lock nut 65 or the like. When the two piezoelectric actuators 60 and 60 are extended by applying voltage, the actuator box 56 is raised against the elastic force of the elastic element 58 while being supported by the base holder 55, accordingly, the valve element 52 is seated off the valve seat 51*b* by its own elastic force to open the fluid passage 51*a*. When the applied voltage to the two piezoelectric actuators 60 and 60 is cut off, while the two piezoelectric actuators 60 and 60 return to their original length dimensions from the elongated state, the actuator box 56 is pushed downward by the elastic force of the elastic element 58, along with this, the valve element 52 is pressed downward by the diaphragm holder 57 and seated on the valve seat 51*b* to close the fluid passage 51*a*.

Further, in FIG. 12, 66 is an inlet-side block, 66*a* is an inlet-side fluid passage, 67 is an outlet-side block, 67*a* is an outlet-side fluid passage, 68 is a gasket, 69 is an orifice, 70 is a pressure sensor.

Since the piezoelectric element driven valve 50 has a configuration of two piezoelectric actuators 60 and 60 arranged in series via a cylindrical spacer 61 capable of drawing out wiring, the displacement amount of the piezoelectric element can be increased as compared with a piezoelectric element driven valve using only one piezoelectric actuator, as a result, there is an advantage that the stroke of the valve element 52 can be increased and a fluid with a large flow rate can be controlled.

PRIOR-ART DOCUMENT

Patent Documents

[Patent Document 1] Japanese Patent Application Laid-Open No. 2003-120832

[Patent Document 2] Japanese Patent Application Laid-Open No. 2005-149075

[Patent Document 3] Japanese Patent Application Laid-Open No. 2008-249002

[Patent Document 4] International Publication No. 2018/123852

[Patent Document 5] International Publication No. 2019/107215

[Patent Document 6] Japanese Patent Application Laid-Open No. 2009-252760

[Patent Document 7] Japanese Patent Application Laid-Open No. 2010-180429

[Patent Document 8] International Publication No. 2019/021949

[Patent Document 9] Japanese Patent Application Laid-Open No. 2016-050645

SUMMARY OF INVENTION

Technical Problem

However, in the piezoelectric element driven valve 50 described above, since the two piezoelectric actuators 60 and 60 having lead terminals 60a at the proximal end portions are arranged in opposite directions and in series, it is difficult to stack three or more piezoelectric actuators 60 using the cylindrical spacer 61, so there is a problem that the stroke cannot be further increased.

Further, in the piezoelectric element driven valve 50, since there is a clearance between the inner peripheral surface of the actuator box 56 and the outer peripheral surface of the cylindrical spacer 61, there is a problem that in the stacked piezoelectric actuators 60 and 60 rattle, so the axes of the two piezoelectric actuators 60 and 60 do not coincide with each other, and the accuracy deteriorates.

Moreover, in the piezoelectric element driven valve 50, the first cylindrical portion 56A and the connecting body 56C that form the actuator box 56 and the second cylindrical portion 56B and the connecting body 56C that also form the actuator box 56 are detachably connected by a screw structure respectively. However, the first cylindrical portion 56A and the connecting body 56C, and the second cylindrical portion 56B and the connecting body 56C have reversed screw structures respectively. Therefore, in a state of accommodating the piezoelectric actuator 60, it requires two persons to connect the first cylindrical portion 56A to the connecting body 56C, and to connect the second cylindrical portion 56B to the connecting body 56C, so there is a problem that the assembly is difficult.

The present invention has been made to solve the above problems. Its main objective is to provide a piezoelectric element driven valve capable of obtaining a large flow rate by further increasing the stroke, as well as matching the axis of a plurality of piezoelectric actuators arranged in series, and being easily assembled by one person, and to provide a pressure type flow rate control device including the piezoelectric element driven valve, and a vaporization supply apparatus including the pressure type flow rate control device.

Solution to Problem

To achieve the above object, the piezoelectric element driven valve according to an embodiment of the present invention includes a main body having a fluid passage and a valve seat, a valve element seated on and off the valve seat for opening and closing the fluid passage, a piezoelectric actuator for driving the opening and closing of the valve element by using an extension of a piezoelectric element, a plurality of actuator boxes formed in a cylindrical shape, provided on the main body, and arranged in series, an outer connecting jig formed in a cylindrical shape, provided between the actuator boxes adjacent to each other, having an opening capable of drawing out wiring, and detachably connecting the actuator boxes adjacent to each other, a plurality of piezoelectric actuators accommodated in the same direction respectively in each of the actuator boxes and arranged in a series, wherein a distal end portion faces toward the valve element and a proximal end portion provided with a terminal faces toward the opposite side of the distal end portion, and, an inner connecting jig formed in a cylindrical shape having an opening capable of drawing out wiring, and slidably accommodated in the outer connecting jig, for positioning the proximal end portion and the distal end portion of the piezoelectric actuators adjacent to each other.

It is preferred that the inner connecting jig is slidably supported on an inner peripheral surface of the outer connecting jig via a plurality of O-rings.

It is preferable to form a plurality of annular O-ring grooves for fitting the O-rings on at least one of the outer peripheral surface of the inner connecting jig and the inner peripheral surface of the outer connecting jig, and to fit the O-rings respectively in the O-ring grooves.

Both end portions of the outer connecting jig are detachably screwed to end portions of the actuator boxes adjacent thereto, and it is preferable that the outer peripheral surface of the outer connecting jig is provided with a parallel engagement surface engaged by a wrench.

The outer connecting jig preferably has a plurality of openings in a circumferential direction for draw out wiring.

The inner connecting jig preferably has a plurality of openings in the circumferential direction for drawing out wiring.

An end portion of the inner connecting jig is closed, it is preferable to have a conical receiving groove positioned in the central portion of the closed outer surface of the end portion, for fitting a hemispherical displacement portion provided in the distal end portion of the piezoelectric actuator in a positioned state.

For the plurality of the piezoelectric actuators, it is preferable to drive a plurality of the piezoelectric actuators at the same applied voltage by connecting wiring in parallel.

The pressure type flow rate control device according to the present invention includes the piezoelectric element driven valve, a restriction portion provided downstream of the piezoelectric element driven valve, and a pressure sensor for measuring a pressure of the fluid passage between the piezoelectric element driven valve and the restriction portion, the flow rate is controlled on the basis of the detected pressure from the pressure sensor.

The vaporization supply apparatus according to the present invention includes the pressure type flow rate control device, a vaporizer provided upstream of the pressure type flow rate control device for vaporizing a liquid raw material, and a supply means for supplying the liquid raw material to be vaporized to the vaporizer for vaporization, the supply means supplying the liquid raw material into the vaporize, and the gas vaporized by the vaporizer being supplied downstream while the flow rate is controlled by the pressure type flow rate control device.

As the supply means, it is preferable to have a control valve for controlling the supply of the liquid raw material to the vaporizer.

Effect of Invention

In the piezoelectric element driven valve according to an embodiment of the present invention, piezoelectric actuators are accommodated in series in the same direction in a plurality of actuator boxes arranged in series, respectively, since the actuator boxes adjacent to each other are connected by an outer connecting jig, while the piezoelectric actuators adjacent to each other are positioned by an inner connecting jig accommodated in the outer connecting jig, it is possible to stack three or more piezoelectric actuators, and a larger flow rate can be obtained by further increasing the stroke.

Further, in the piezoelectric element driven valve according to an embodiment of the present invention, since the piezoelectric actuators adjacent to each other are positioned by the inner connecting jig slidably accommodated in the outer connecting jig, it is possible to match the axis of the plurality of piezoelectric actuators arranged in series, and the fluid of a large flow rate can be controlled with high accuracy.

Moreover, in the piezoelectric element driven valve according to an embodiment of the present invention, since each piezoelectric actuator in each of the plurality of actuator boxes respectively are accommodated in the same orientation, the assembly can be easily performed by a single person, to just assembling and connecting each member in order.

Since the pressure type flow rate control device according to an embodiment of the present invention includes the piezoelectric element driven valve described above, it is possible to control the fluid of a large flow rate with high accuracy.

Since the vaporization supply apparatus according to the present invention includes the above-mentioned pressure type flow rate control device, a vaporizer for vaporizing the liquid raw material and supplying it to the pressure type flow rate control device, and a supply means for supplying the liquid raw material to the vaporizer, it is possible to supply gas of a large flow rate to a semiconductor manufacturing facility or the like.

DESCRIPTION OF EMBODIMENTS

Hereinafter, embodiments of the present invention will be described in detail with reference to the drawings.

Figure 1:
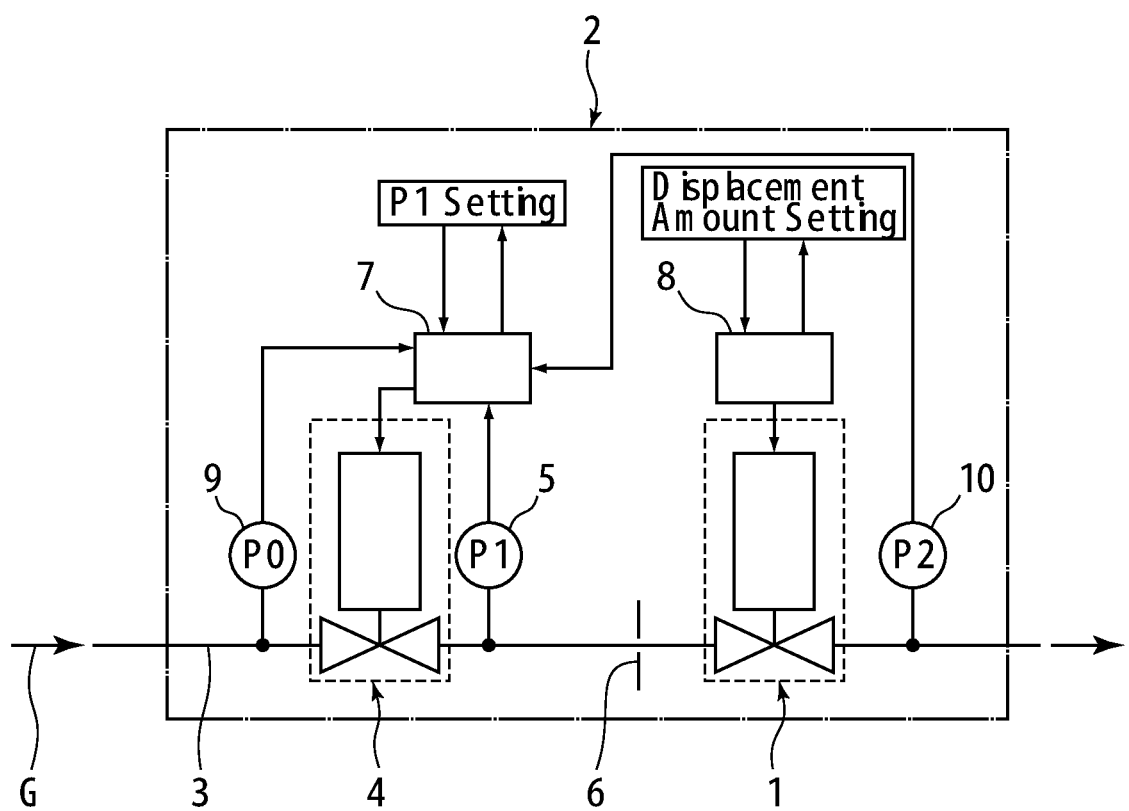
FIG. 1 is a schematic diagram showing an example of a flow rate control device including a piezoelectric element driven valve according to an embodiment of the present invention.

FIG. 1 shows an example of the flow rate control device 2 provided with the piezoelectric element driven valve 1 according to an embodiment of the present invention, wherein the flow rate control device 2 includes a pressure control valve 4 provided in a fluid passage 3 on the inflow side of a gas G used in a semiconductor manufacturing facility, a piezoelectric element driven valve 1 (two-stage piezo valves) provided downstream of the pressure control valve 4 and having two piezoelectric actuators 23A and 23B for controlling the flow rate of the gas G, a first pressure sensor 5 for detecting a pressure P1 downstream of the pressure control valve 4 and upstream of the piezoelectric element driven valve 1, a restriction portion 6 (for example, an orifice plate) disposed downstream of the pressure control valve 4, a first control circuit 7 for controlling the opening and closing operation of the pressure control valve 4 on the basis of the output of the first pressure sensor 5, a second control circuit 28 for controlling the piezoelectric element driven valve 1, an inflow pressure sensor 9 for detecting a supply pressure P0 upstream of the pressure control valve 4, and a second pressure sensor 10 for detecting a downstream pressure P2 downstream of the piezoelectric element driven valve 1.

The flow rate control device 2 is configured to control the flow rate of the fluid flowing downstream of the piezoelectric element driven valve 1 by controlling the pressure control valve 4 so that the upstream pressure output from the first pressure sensor 5 becomes a set value and by controlling the driving of the piezoelectric actuators 23A and 23B of the piezoelectric element driven valve 1, by use of the first control circuit 7 and the second control circuit 8.

Figure 2:
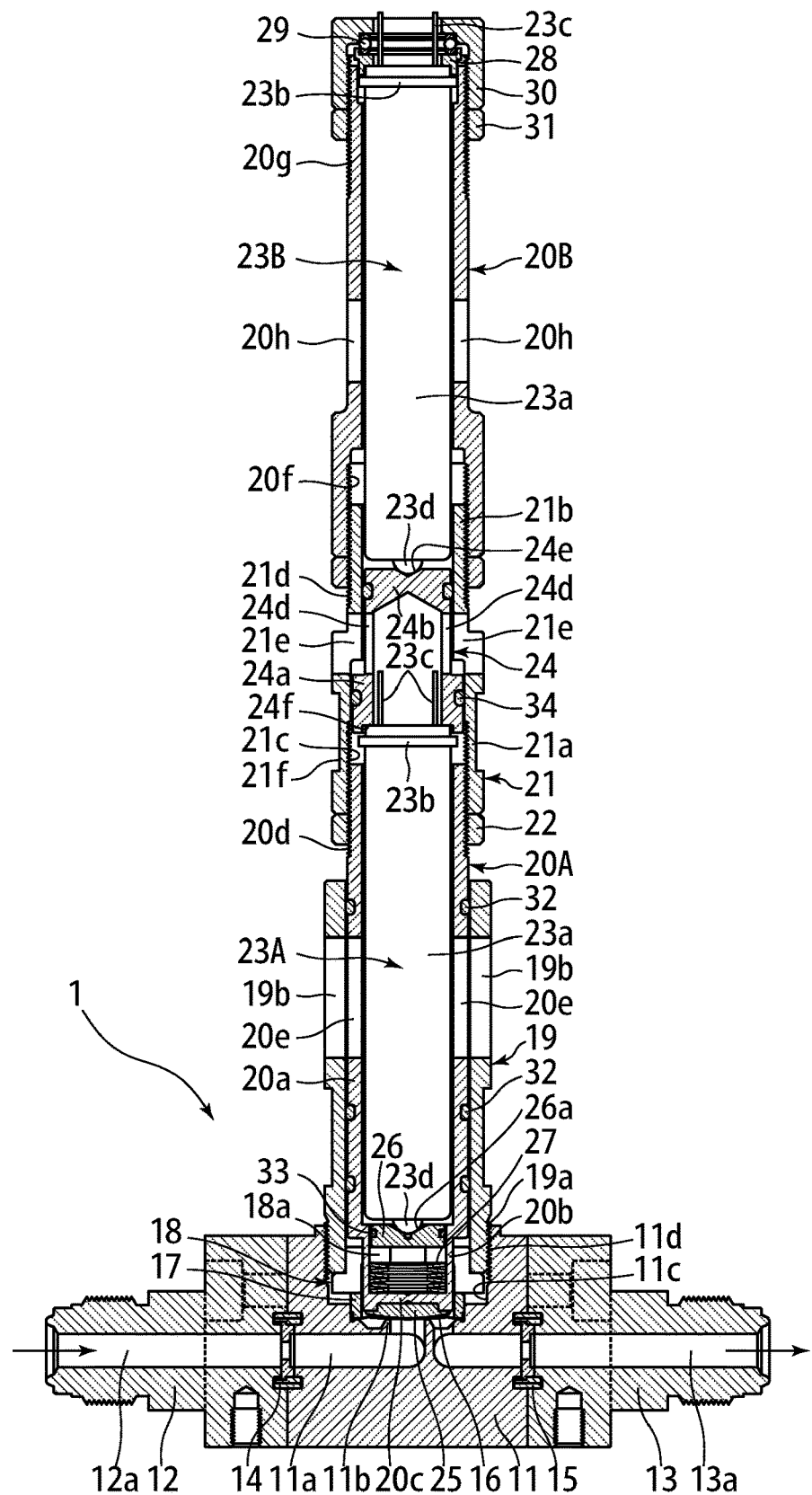
FIG. 2 is a longitudinal sectional view of a piezoelectric element driven valve according to an embodiment of the present invention.

The piezoelectric element driven valve 1 (two-stage piezo valves) according to an embodiment of the present invention, as shown in FIG. 2, includes a main body 11 having a fluid passage 11a and a valve seat 11b, an inlet-side block 12 fixed to the upstream end side of the main body 11, an outlet-side block 13 fixed to the downstream end side of the main body 11, a gasket 14 for sealing provided between the main body 11 and the inlet-side block 12, a gasket 15 for sealing provided between the main body 11 and the outlet-side block 13, a valve element 16 seat on and off the valve seat 11b of the main body 11 for opening and closing the fluid passage 11a, a hold adapter 17 for pressing and fixing the outer peripheral edge of the valve element 16 to the main body 11 side, a split base 18 formed in half split for pressing the hold adapter 17 to the main body 11 side, a base holder 19 for pressing the hold adapter 17 and the seizing base 18 to the main body 11 side, two actuator boxes 20A and 20B disposed in series in the vertical direction, an outside connection jig 21 formed in a cylindrical shape, provided between the two actuator boxes 20A and 20B adjacent to each other, detachably connecting the actuator boxes 20A and 20B adjacent to each other, and having opening portions 21e for drawing out wiring, a locknuts 22 for locking the outside connection jig 21, two piezoelectric actuators 23A and 23B, each accommodated in the same direction within each of the actuator boxes 20A and 20B, and disposed in a series in the vertical direction with the distal end portion facing the valve element 16, and the proximal end portion, provided with a terminal, facing the opposite side of the distal end portion, an inner connection jig 24 slidably accommodated in the outside connection jig 21, for positioning the proximal end portion and distal end portion of the piezoelectric actuators 23A and 23B adjacent to each other, and having an opening 24d for drawing out wiring, a diaphragm holder 25 provided on the lower actuator box 20A, a ball receiver 26, accommodated in the lower actuator box 20A, for supporting the lower piezoelectric actuator 23A, an elastic element 27, accommodated in the lower actuator box 20A, for pressing the lower actuator box 20A downward, a bearing receiver 28 abutting the proximal end portion of the upper piezoelectric actuator 23B, a thrust bearing 29 abutting the bearing receiver 28, a cap nut 30 for adjustment to press the bearing receiver 28 and the thrust bearing 29 toward the upper piezoelectric actuator 23B side, and a lock nut 31 for locking the adjustment cap nut 30.

The piezoelectric element driven valve 1 (two-stage piezo valves) is configured as a normally closed piezoelectric element driven valve 1, when the two piezoelectric actuators 23A and 23B are extended by applying voltage, in a state where the lower actuator box 20A is supported by the base holder 19, the lower actuator box 20A, the outer connecting jig 21, and the upper actuator box 20B rise against the elastic force of the elastic element 27, along with this, the valve element 16 seats off from the valve seat 11b by its own elastic force to open the fluid passage 11a, further, by cutting off the applied voltage to the two piezoelectric actuators 23A and 23B, the two piezoelectric actuators 23A and 23B return from the extended state to their original dimensions, and the lower actuator box 20A, the outer connecting jig 21, and the upper actuator box 20B are pushed downward by the elastic force of the elastic element 27, along with this, the valve element 16 is pressed down by the diaphragm holder 25, and seat on the valve seat 11b to close the fluid passage 11a.

In addition, in the present embodiment, the piezoelectric element driven valve 1 is arranged in the vertical position, in other embodiments, the piezoelectric element driven valve 1 may be arranged in the horizontal position. In the case of the horizontal position, the two piezoelectric actuators 23A, 23B are arranged in a straight-line front and rear or left and right via the inner connecting jig 24.

The main body 11, as shown in FIG. 2, is formed in a block shape by a metal material such as stainless steel, and includes a fluid passage 11a, a concave portion 11c opened at the top communicating with the fluid passage 11a, an annular valve seat 11b formed on the bottom surface of the concave portion 11c, and an internal thread 11d formed on the inner peripheral surface of the concave portion 11c, to which the base holder 19 is screwed.

The inlet-side block 12, as shown in FIG. 2, is formed in a block shape by the same metal material as the main body 11 and has an inlet-side fluid passage 12a communicating to the fluid passage 11a of the main body 11. This inlet-side block 12 is fixed to the upstream side end surface of the main body 11 by a bolt (not shown). A gasket 14 for sealing is interposed between the inlet-side block 12 and the main body 11.

The outlet-side block 13, as shown in FIG. 2, is formed in a block shape by the same metal material as the main body 11 and has an outlet-side fluid passage 13a communicating to the fluid passage 11a of the main body 11. The outlet-side block 13 is fixed by a bolt (not shown) to the downstream side end surface of the main body 11. A gasket 15 for sealing is interposed between the outlet-side block 13 and the main body 11.

The valve element 16 is made of a self-elastic return type metal diaphragm formed in an inverted dish shape, with a central portion slightly bulged upward, by a metal material having excellent durability, corrosion resistance, and heat resistance, and is disposed in the concave portion 11c so as to face the valve seat 11b, and its outer peripheral edge is held and fixed in an airtight manner toward the main body 11 by the hold adapter 17 or the like, while seating on the valve seat 11b by being pressed downward, and seating off from the valve seat 11b by its own elastic force when the pressing force is lost. Further, the metal diaphragm forming the valve element 16 may be coated with a fluorine resin, for example, PFA.

In addition, the material of the metal diaphragm may be stainless steel or Inconel, other alloy steel, also, the metal diaphragm may be a metal diaphragm formed by using a single metal diaphragm or may be a metal diaphragm formed by laminating a plurality of diaphragms, further, the shape of the metal diaphragm may be a flat plate.

The hold adapter 17, as shown in FIG. 2, is formed in an annular shape by a metal material such as stainless steel and is inserted into the concave portion 11c of the main body 11 for pressing and fixing the outer peripheral edge portion of the valve element 16 (metal diaphragm) in an airtight manner to the main body 11.

The split base 18 is configured in the same structure as the split base described in Patent Document 6 (JP 2016-050645), having a pair of half-split-shaped split base pieces formed by a metallic material such as stainless steel. Each piece of the split base 18 is assembled in the lower end portion of the lower actuator box 20A, with the two pieces facing each other from both sides. In this state, each piece of the split base and the lower end portion of the actuator box 20A are inserted in the concave portion 11c of the main body 11, and the lower end portion of the base holder 19 is screwed into the concave portion 11c and fixed thereto. Thereby, the split base is held and fixed in the concave portion 11c of the main body 11 while pressing the hold adapter 17 in the concave portion 11c of the main body 11.

The two split base pieces constituting the split base 18 are inserted into guide holes (not shown) formed in the lower end peripheral wall of the lower actuator box 20A, and respectively provided with fitting portions 18a facing the upper surface of the bottom wall 20c of the lower actuator box 20A, and between the fitting portions 18a and the bottom wall 20c of the lower actuator box 20A, an elastic element 27 composed of a plurality of Belleville springs for pressing the lower actuator box 20A downward and seating the central portion of the valve element 16 against the valve seat 11b via the diaphragm holder 25 (see FIG. 2).

The base holder 19, as shown in FIG. 2, is formed in a cylindrical shape by a metal material such as stainless steel, and an external thread 19a detachably screwed to an internal thread 11d of the main body 11 is formed on the outer peripheral surface of the lower end portion. Further, the peripheral wall of the base holder 19 is provided with a plurality of openings 19b along the circumferential direction for reducing the weight of the base holder 19 and releasing the heat of the lower piezoelectric actuator 23A. The base holder 19 is screwed to the main body 11 in an upright position, for supporting the lower actuator box 20A so as to freely move up and down on the side of the main body 11, at the same time pressing and fixing the outer peripheral portion of the valve element 16, the hold adapter 17, and the split base 18 to the side of the main body 11.

The two actuator boxes 20A and 20B arranged in series in the vertical direction are formed of a metal material such as stainless steel or an invar material (invar, super invar, stainless invar, or the like). The lower actuator box 20A accommodates the lower piezoelectric actuator 23A, the elastic element 27, and the ball receiver 26. The upper actuator box 20B accommodates the upper piezoelectric actuator 23B.

That is, the lower actuator box 20A, as shown in FIG. 2, is formed in a bottomed cylindrical shape by a metal material such as stainless steel or an invar material of a low coefficient of thermal expansion (preferably, an invar material having a coefficient of thermal expansion of $2 \times 10^{-6}$/K or less), and includes a large diameter portion 20a formed in a cylindrical shape accommodating the lower piezoelectric actuator 23A and being inserted in the base holder 19 so as to be slidable in the vertical direction via a plurality of O-rings 32, a small diameter portion 20b, that is smaller than the large diameter portion 20a, formed in a cylindrical shape, and integrally formed with the lower end portion of the large diameter portion 20a for accommodating the elastic element 27 and the ball receiver 26, a bottom wall 20c integrally formed with the small diameter portion 20b for closing the lower end portion of the small diameter portion 20b, vertically long guide holes (not shown) formed in opposite direction on the peripheral surface of the boundary portion between the large diameter portion 20a and the small diameter portion 20b, for inserting a fitting portion 18a of the split base 18, an external thread 20d for detachably screwing the connection jig 21 formed on the outer peripheral surface of the upper end portion of the large diameter portion 20a, and a plurality of openings 20e formed along the circumferential direction on the peripheral wall of the large diameter portion 20a for reducing the weight of the lower actuator box 20A and releasing heat from the lower piezoelectric actuator 23A.

In addition, a diaphragm holder 25 formed in a disk shape by a synthetic resin material is fitted and fixed to the bottom surface of the bottom wall 20c of the lower actuator box 20A.

On the other hand, the upper actuator box 20B, as shown in FIG. 2, is formed in a cylindrical shape by a metal material such as stainless steel or an invar material having a small coefficient of thermal expansion (preferably, an invar material having a coefficient of thermal expansion of $2 \times 10^{-6}$/K or less). An internal thread 20f is formed on the inner peripheral surface of the lower end portion for detachably screwing the outer connecting jig 21. An external thread 20g is formed on the outer peripheral surface of the upper end portion screwing the adjustment cap nut 30 and the lock nut 31 so as to be vertically movable and adjustable. In addition, the peripheral wall of the upper actuator box 20B is provided with a plurality of openings 20h along the circumferential direction for reducing the weight of the upper actuator box 20B and releasing the heat of the upper piezoelectric actuator 23B.

The outer connecting jig 21 is formed in a cylindrical shape by a metal material such as stainless steel or an invar material having a small coefficient of thermal expansion (preferably, an invar material having a coefficient of thermal expansion of $2 \times 10^{-6}$/K or less), detachably connects the lower actuator box 20A and the upper actuator box 20B, and accommodates the inner connecting jig 24 and the like inward.

Figure 3:
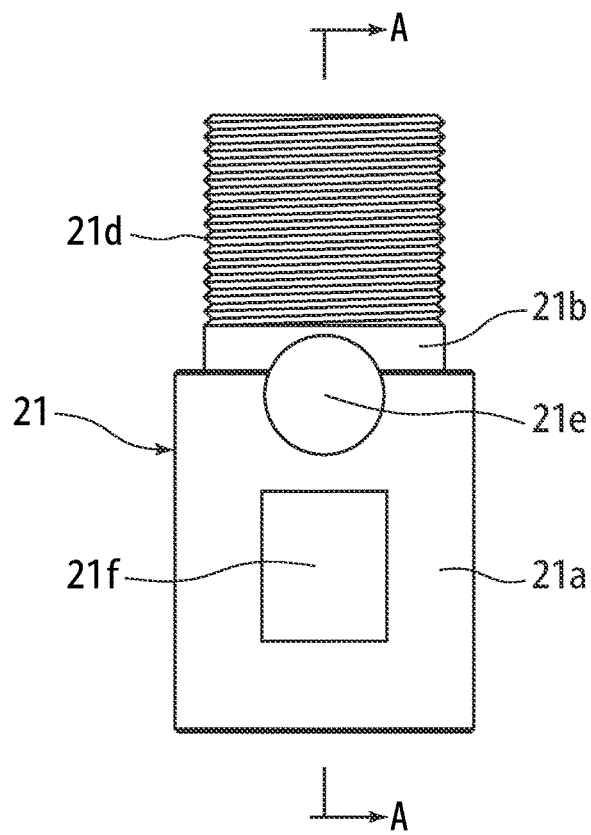
FIG. 3 is a front view of an outer connection jig used in the piezoelectric element driven valve.
Figure 4:
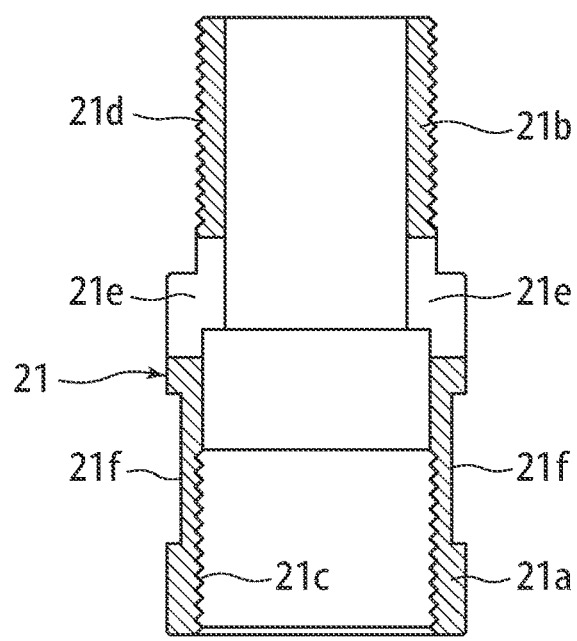
FIG. 4 is a sectional view taken along line A-A of FIG. 3.

That is, the outer connecting jig 21, as shown in FIGS. 2 to 4, includes a large-diameter portion 21a formed in a cylindrical shape, connected to the upper end portion of the lower actuator box 20A, a small-diameter portion 21b formed in a cylindrical shape, having a smaller diameter than the large-diameter portion 21a, integrally provided at the upper end portion of the large-diameter portion 21a and connected to the lower end portion of the upper actuator box 20B, an internal thread 21c formed on the inner peripheral surface of the large-diameter portion 21a and detachably attached to an external thread 20d of the lower actuator box 20A, an external thread 21d formed on the outer peripheral surface of the small-diameter portion 21b and detachably attached to an internal thread 20f of the upper actuator box 20B, and circular-shaped opening portions 21e, for drawing out wiring, formed facing each other on the outer peripheral surface of the boundary portion of the large-diameter portion 21a and the small-diameter portion 21b, a parallel engagement surface 21f for engaging a wrench (not shown), formed on the outer peripheral surface of the large-diameter portion 21a.

In addition, in the above embodiment, two circular-shaped opening portions 21e are formed in the outer connecting jig 21 facing each other, but in other embodiments, only one opening portion 21e may be formed in the outer connecting jig 21, or three or more opening portions 21e may be formed in the outer connecting jig 21 along the circumferential direction at predetermined intervals. When a plurality of openings 21e is formed in the outer connecting jig 21, wiring can be pulled out in any direction of the outer connecting jig 21. Further, the shape of the opening 21e is not limited to a circular shape and may be a rectangular opening (not shown) or another shaped opening (not shown).

The two upper and lower piezoelectric actuators 23A and 23B arranged in series are configured as stacked piezoelectric actuators 23A and 23B, in which a stacked piezoelectric element (not shown) is accommodated in a metal casing 23a having a closed distal (lower end) portion the proximal end (upper end) portion of the casing 23a is airtightly sealed by a stepped base 23b, and a plurality of terminals 23c (lead terminals) protrude from the base 23b, and a hemispherical displacement portion 23d provided at the distal (lower end) portion of the casing 23a is displaced along the axis of the piezoelectric actuators 23A and 23B in accordance with expansion and contraction of the piezoelectric element.

The lower piezoelectric actuator 23A, as shown in FIG. 2, is accommodated in the lower actuator box 20A in the state where the hemispherical displacement portion 23d faces downward, the distal end portion (displacement portion 23d) is supported in the fitting portion 18a of the split base 18 via the ball receiver 26, while the terminal 23c (lead terminal) is located in the inner connection jig 24.

In addition, the ball receiver 26, as shown in FIG. 2, is formed in a disc shape by a metal material such as stainless steel material. A receiving groove 26a is formed in a conical shape in the upper surface center portion of the ball receiver 26, with the hemispherical displacement portion 23d of the lower piezoelectric actuator 23A fitted in a state of being positioned. Further, the ball receiver 26 is accommodated in the small-diameter portion 20b of the lower actuator box 20A via an O-ring 33 fitted on the outer peripheral surface of the ball receiver 26. Therefore, through the elastic O-ring 33 fitted to the outer peripheral surface, the ball receiver 26 can protrude the center without rattling or deviating from the lateral direction (direction perpendicular to the axis of the ball receiver 26).

On the other hand, the upper piezoelectric actuator 23B, as shown in FIG. 2, is accommodated in the upper actuator box 20B with the hemispherical displacement portion 23*d* facing downward, while its distal end portion (displacement portion 23*d*) is stacked on the lower piezoelectric actuator 23A via an inner connection jig 24, and its proximal end (stepped base 23*b*) is supported via a bearing receiver 28 and a thrust bearing 29 by an adjustment cap nut 30 screwed to the upper end portion of the upper actuator box 20B so as to be vertically movable and adjustable.

Moreover, the terminal 23*c* (lead terminal) of the upper piezoelectric actuator 23B protrudes upward from the adjustment cap nut 30.

In addition, wiring (not shown) is connected in parallel to each of the terminals 23*c* (lead terminals) of the two upper and lower piezoelectric actuators 23A and 23B arranged in series, so that the upper and lower two piezoelectric actuators 23A and 23B can be driven by the same applied voltage.

Thus, the upper and lower piezoelectric actuators 23A and 23B extend upward by applying voltage to push up the lower actuator box 20A, the upper actuator box 20B, and the outer connecting jig 21 connecting the two actuator boxes 20A and 20B, against the elastic force of the elastic element 27.

The inner connecting jig 24 is formed by a metal material such as stainless steel or an invar material having a small coefficient of thermal expansion (preferably, an invar material having a coefficient of thermal expansion of $2\times10^{-6}$/K or less) in a cylindrical shape with its upper end portion being closed, slidably accommodated in the outer connecting jig 21, and configured to position the proximal end portion of the lower piezoelectric actuator 23A and the distal end portion of the upper piezoelectric actuator 23B, and to be able to draw out wiring.

Figure 5:
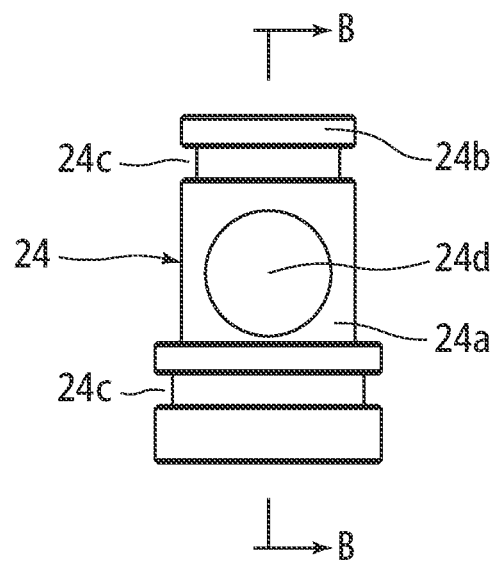
FIG. 5 is a front view of an inner connecting jig used in the piezoelectric element driven valve.
Figure 6:
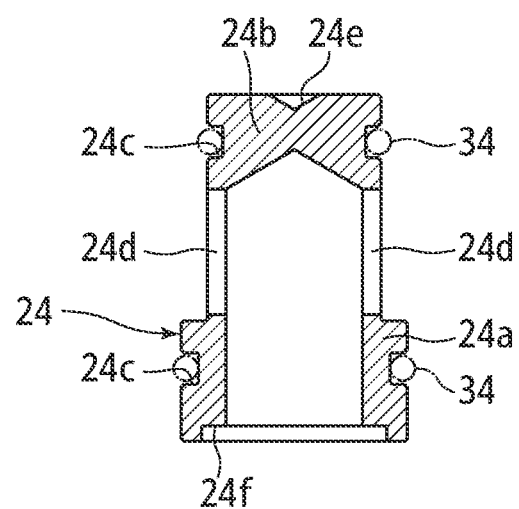
FIG. 6 is a sectional view taken along line B-B of FIG. 3.

That is, as shown in FIG. 2, FIG. 5, and FIG. 6, the inner connecting jig 24 includes a cylindrical portion 24*a* accommodated in the outer connecting jig 21, an upper wall 24*b* integrally provided at the upper end portion of the cylindrical portion 24*a* and closing the upper end portion of the cylindrical portion 24*a*, two annular O-ring grooves 24*c* formed at the outer peripheral surface of the lower end portion of the cylindrical portion 24*a* and the outer peripheral surface of the upper wall 24*b*, for fitting the O-ring 34, two opening 24*d* formed in a circular shape facing each other on the cylindrical portion 24*a* for drawing out wiring, a receiving groove 24*e* formed in a conical shape at the central of the upper surface of the upper wall 24*b*, and fitted in a state where the hemispherical displacement portion 23*d* of the upper piezoelectric actuator 23B is positioned, and a stepped portion 24*f* formed at the lower end portion of the cylindrical portion 24*a* for tightly fitting the stepped base 23*b* of the lower piezoelectric actuator 23A.

The inner connecting jig 24 is accommodated in the outer connecting jig 21 so as to be slidable in the vertical direction by inserted into the outer connecting jig 21 with the O-rings 34 fitted into the upper and lower two O-ring grooves 24*c* respectively. In addition, while the stepped base 23*b* of the lower piezoelectric actuator 23A is fitted to the stepped portion 24*f* of the inner connecting jig 24, the hemispherical displacement portion 23*d* of the upper piezoelectric actuator 23B is fitted to the conical receiving groove 24*e* of the inner connecting jig 24 in a positioned state.

Since the inner connecting jig 24 is slidably guided in the vertical direction into the outer connecting jig 21 by the two elastic upper and lower O-rings 34, the inner connecting jig 24 is free from rattling and is free from deviating in the lateral direction (a direction perpendicular to the axis of the inner connecting jig 24), so that the inner connecting jig 24 can be aligned in the center. As a result, the axes of the lower piezoelectric actuator 23A supported by the ball receiver 26 and the upper piezoelectric actuator 23B supported by the inner connecting jig 24 can be made to coincide with each other.

In addition, in the above embodiment, even though two circular opening portions 24*d* are formed in the inner connecting jig 24 facing each other, but in other embodiments, only one opening portion 24*d* may be formed in the inner connecting jig 24, or three or more opening portions 24*d* may be formed in the inner connecting jig 24 along the circumferential direction at predetermined intervals. When a plurality of openings 24*d* are formed in the inner connection jig 24, the wiring can be pulled out in any direction of the inner connection jig 24. The shape of the opening 24*d* is not limited to a circular shape and may be a rectangular opening (not shown) or another opening (not shown).

Further, in the above embodiment, a plurality of O-ring grooves 24*c* are formed on the outer peripheral surface of the inner connecting jig 24, each of the O-rings 34 is fitted into each O-ring groove 24*c*, and the inner connecting jig 24 is slidably accommodated in the outer connecting jig 21 via the O-rings 34. However, in other embodiments, although not shown, a plurality of O-ring grooves are formed on the inner peripheral surface of the outer connecting jig 21, each O-ring is fitted into each O-ring groove, and the inner connecting jig 24 may be slidably accommodated in the outer connecting jig 21 via the O-rings.

Thus, according to the piezoelectric element driven valve 11 described above, when the drive voltage is applied from the second control circuit 8 to the upper and lower two-stage piezoelectric actuators 23A and 23B, the upper and lower two-stage piezoelectric actuators 23A and 23B extend upward by the set value in accordance with the applied voltage.

Hereby, a large pushing force acts on the upper actuator box 20B via the inner connection jig 24, the bearing receiver 28, the thrust bearing 29, and the adjustment cap nut 30. Thereby, the upper actuator box 20B, the lower actuator box 20A, and the outer connection jig 21 connecting the two actuator boxes 20A, 20B rise by the set value against the elastic force of the elastic element 27 in a state of being supported by the base holder 19. As a result, the elastic element 27 seats off from the valve seat 11*b* by its own elastic force, so that the piezoelectric element driven valve 1 is brought into the open state. Further, the opening degree of the piezoelectric element driven valve 1 is adjusted by changing the voltage applied to the piezoelectric element.

On the other hand, when the voltage applied to the upper and lower two-stage piezoelectric actuators 23A and 23B is cut off, while the upper and lower two-stage piezoelectric actuators 23A and 23B return from the extension state to the original length dimension, the actuator boxes 20A and 20B are pushed downward by the elastic force of the elastic element 27, and the central portion of the valve element 16 is pushed downward to the valve seat 11*b* side by the diaphragm holder 25 provided at the lower end portion of the actuator box 20A so as to be seated on the valve seat 11*b*, so that the piezoelectric element driven valve 1 is brought into the closed state.

Figure 7:
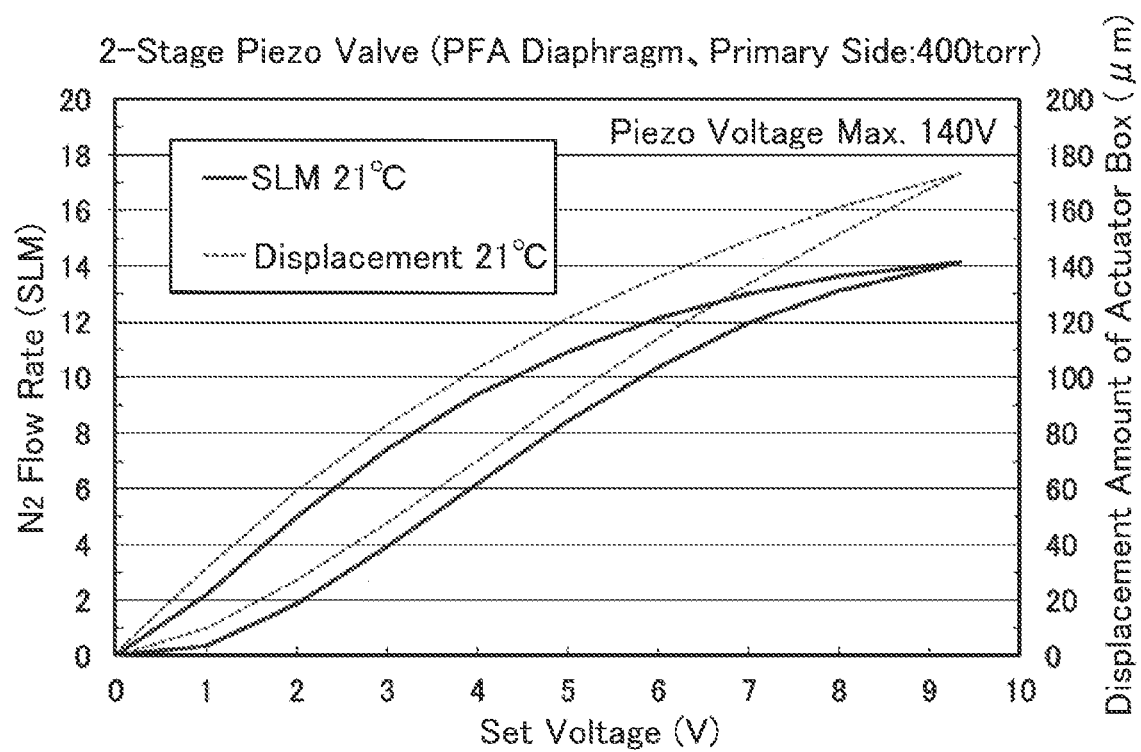
FIG. 7 is a graph showing the relationships among the flow rate of the piezoelectric element driven valve (piezoelectric element driven valve shown in FIG. 2) according to an embodiment of the present invention, the displacement amount of the actuator box, and the set voltages.

FIG. 7 is a graph showing the relationships among the flow rate of the piezoelectric element driven valve 1 (two-stage piezo valves) according to an embodiment of the present invention, in which two piezoelectric actuators 23A and 23B are stacked in two stages, the displacement amount of the actuator boxes 20A and 20B, and the set voltages. The solid line shows the flow rate of the gas ($N_2$), and the broken line shows the displacement amount of the actuator boxes 20A and 20B. At this time, the supply pressure of the gas ($N_2$) on the primary side was 400 torr, and the temperature of the gas ($N_2$) was 21° C.

Figure 8A:
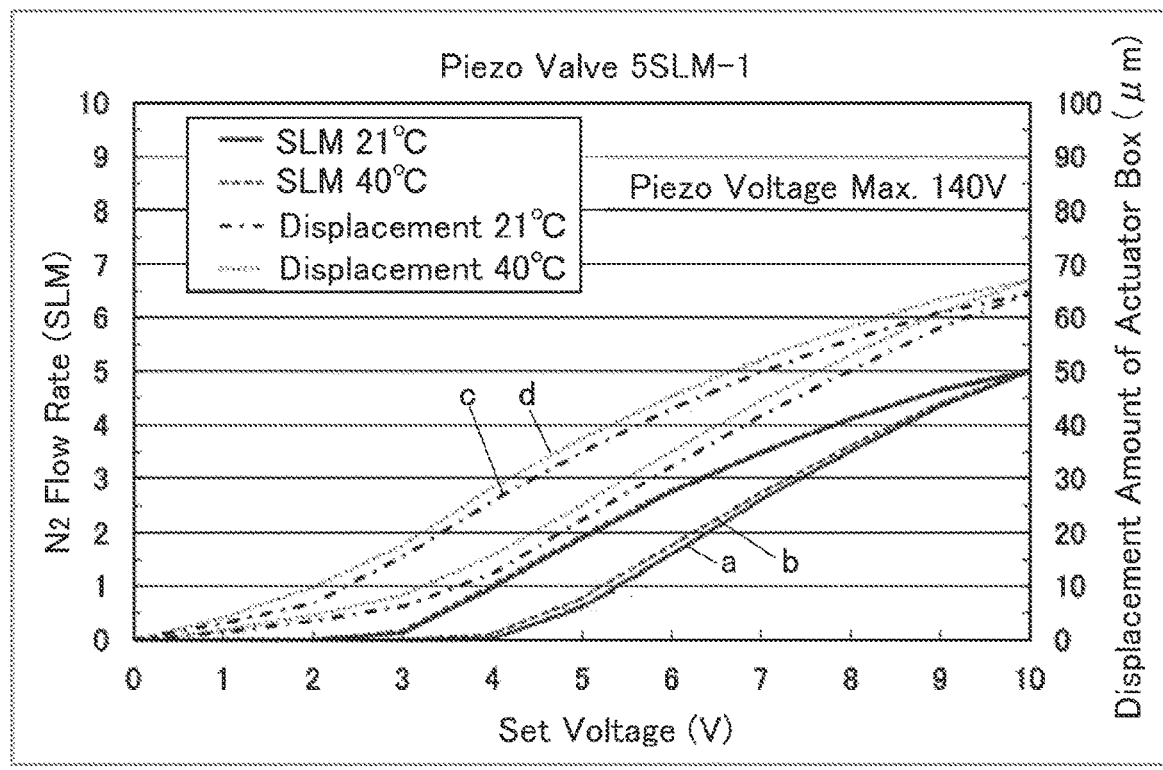
FIG. 8A is a graph showing relationships among the flow rate of a conventional piezoelectric element driven valve having a single-stage piezoelectric actuator, the displacement amount of the actuator box, and the set voltages.
Figure 8B:
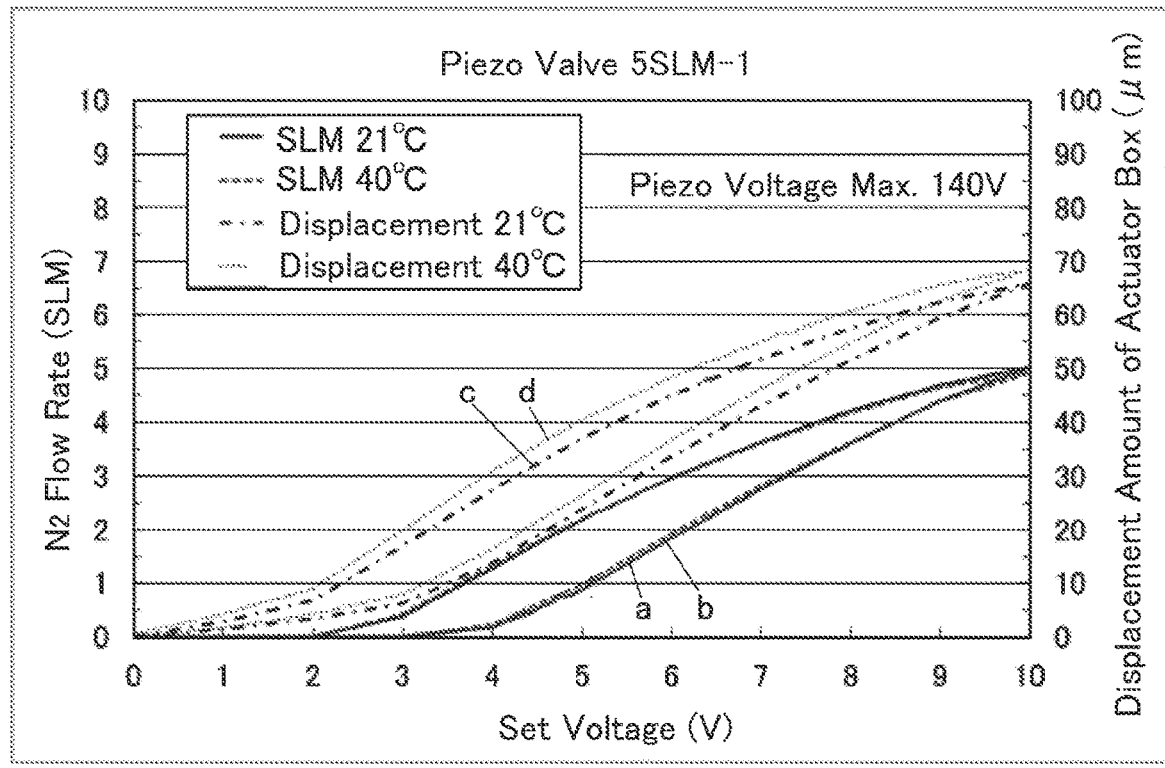
FIG. 8B is a graph showing relationships among the flow rate of another conventional piezoelectric element driven valve having a single-stage piezoelectric actuator, the displacement amount of the actuator box, and the set voltages.

Further, FIGS. 8A and 8B are graphs showing the relationships among the flow rate of each of two piezoelectric element driven valves (piezo valves), the displacement amount of the actuator box, and the set voltages, wherein the each of the two piezoelectric element driven valves (piezoelectric valves) uses a conventional piezoelectric element driven valve having a single-stage piezoelectric actuator. At this time, the supply pressure of the gas ($N_2$) on the primary side was 400 torr, and the temperature of the gas ($N_2$) was 21° C. and 40° C. In the graphs of FIGS. 8A and 8B, the reference symbol "a" represents the flow rate of the gas when the temperature of the gas is 21° C., the reference symbol "b" represents the flow rate of the gas when the temperature of the gas is 40° C., the reference symbol "c" represents the displacement amount of the actuator box when the temperature of the gas is 21° C., and the reference symbol "d" represents the displacement amount of the actuator box when the temperature of the gas is 40° C.

As shown obviously from the graphs of FIGS. 7, 8A and 8B, it can be seen that the flow rate of the piezoelectric element driven valve 1 (two-stage piezo valves) according to the embodiment of the present invention, in which the piezoelectric actuators 23A and 23B are formed in two stages, is much higher than that of the conventional piezoelectric element driven valve (piezo valve), in which the piezoelectric actuator is formed in single-stage. That is, in the single-stage piezoelectric element driven valve, when the gas supply pressure is 400 torr, the displacement amount of the actuator box is about 65 μm to 68 μm, and the maximum flow rate is about 5 SLM. On the other hand, in the two-stage piezoelectric element driven valve 1, when the gas supply pressure is 400 torr, the displacement amount of the actuator boxes 20A and 20B is about 170 μm, and the maximum flow rate is about 14 SLM, so that the flow rate can be made to flow twice or more as compared with that of the conventional single-stage piezoelectric element driven valve.

Figure 9:
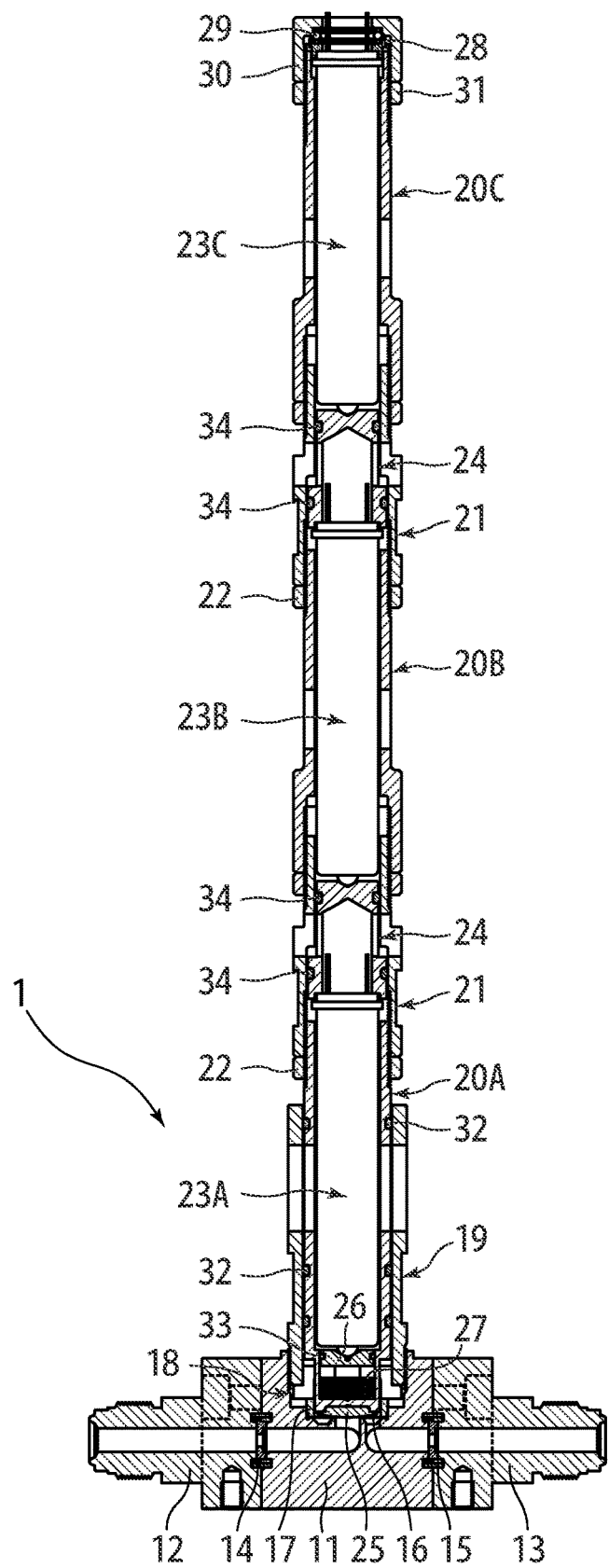
FIG. 9 is a longitudinal sectional view of a piezoelectric element driven valve according to another embodiment of the present invention.

FIG. 9 shows a piezoelectric element driven valve 1 according to another embodiment of the present invention, configured as a three-stage piezoelectric valve with piezoelectric actuators 23A, 23B, and 23C stacked in three stages, in which three actuator boxes 20A, 20B, and 20C are arranged in series in the vertical direction, adjacent actuator boxes 20A, 20B, and 20C are connected to each other by outer connecting jigs 21, while piezoelectric actuators 23A, 23B, and 23C are accommodated in the three actuator boxes 20A, 20B, and 20C respectively in the same direction, adjacent piezoelectric actuators 23A, 23B, and 23C are positioned by inner connecting jigs 24 slidably accommodated in each outer connecting jig 21 respectively.

The actuator box 20C of the third stage is formed in exactly the same shape and the same structure as the actuator box 20B of the second stage, the outer connecting jig 21 of the second stage is formed in exactly the same shape and the same structure as the outer connecting jig 21 of the first stage, furthermore, the inner connecting jig 24 of the second stage is formed in exactly the same shape and the same structure as the inner connecting jig 24 of the first stage.

In addition, the same members as those of the piezoelectric element driven valve 1 shown in FIG. 2 are denoted by the same reference numerals, and detailed description thereof are omitted. Moreover, wiring (not shown) is connected in parallel to the terminals 23c (lead terminals) of the upper and lower three piezoelectric actuators 23A, 23B, and 23C arranged in series, so that the upper and lower three piezoelectric actuators 23A, 23B, and 23C can be driven by the same applied voltage.

In the piezoelectric element driven valve 1 shown in FIG. 9, since the piezoelectric actuators 23A, 23B, and 23C are stacked in three stages, the stroke can be increased, and a larger flow rate can be obtained. That is, in the three-stage piezoelectric element driven valve 1 shown in FIG. 9, when the gas supply pressure is 400 torr, the displacement amount of the actuator boxes 20A, 20B, and 20C is about 255 μm, and the maximum flow rate is about 22 SLM.

In the piezoelectric element driven valve 1 according to the embodiment of the present invention described above, the piezoelectric actuators 23A, 23B, and 23C are accommodated in series in the plurality of actuator boxes 20A, 20B, and 20C arranged in series in the same direction, respectively, and the adjacent actuator boxes 20A, 20B, and 20C are connected by the outer connection jigs 21, and the adjacent piezoelectric actuators 23A, 23B, and 20C are positioned by the inner connection jigs 24 accommodated in the outer connection jigs 21, and thereby more than two or three of the piezoelectric actuators 23A, 23B, and 20C can be stacked, the stroke can be increased, and a large flow rate can be obtained.

Moreover, in the piezoelectric element driven valve 1, since the adjacent piezoelectric actuators 23A, 23B, and 23C are positioned by the inner connecting jig 24 slidably accommodated in the outer connecting jig 21, the axes of the plurality of piezoelectric actuators 23A, 23B, and 23C arranged in series can be made to coincide with each other, and the fluid of a large flow rate can be controlled with high accuracy.

Furthermore, in the piezoelectric element driven valve 1, since each piezoelectric actuator 23A, 23B, and 23C is accommodated in each of plurality of actuator boxes 20A, 20B, and 20C respectively in the same direction, the assembly can be easily performed by one person, only by connecting the members in order during assembly. For example, the assembly of the piezoelectric element driven valve 1 of the two stages (two-stage piezo valve) may be made by just connecting the first stage actuator box 20A accommodating the first stage piezoelectric actuator 23A to the outer connecting jig 21 accommodating the inner connecting jig 24, and connecting the outer connecting jig 21 to the second stage actuator box 20B, then accommodating the second stage piezoelectric actuator 23B into the second stage actuator box 20B. Also, the assembly of the three-stage piezoelectric element driven valve 1 (three-stage piezo valve) may be made by connecting each member in order.

Figure 10:
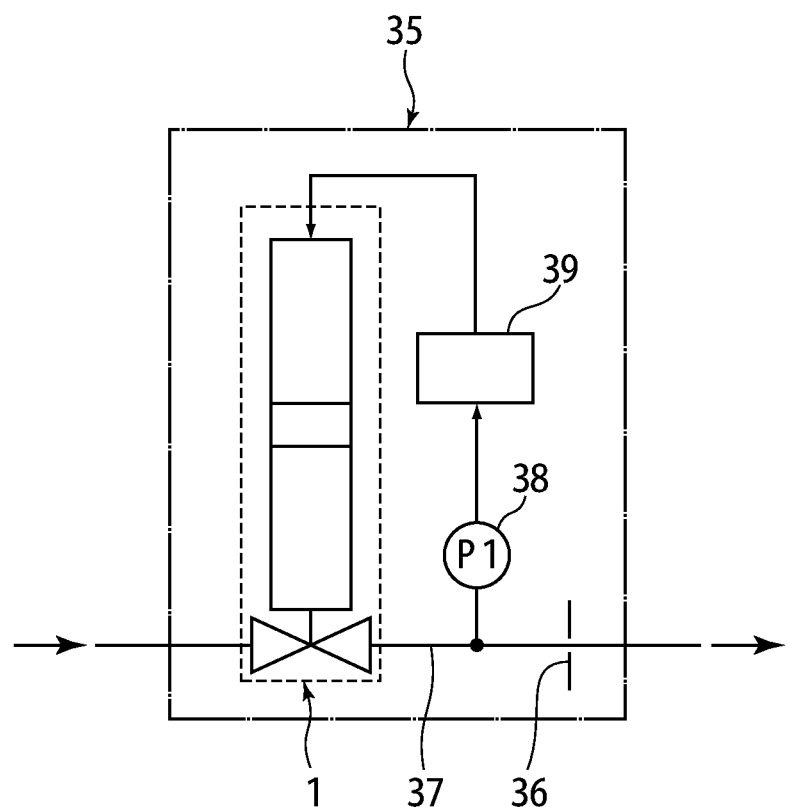
FIG. 10 is a schematic diagram showing an example of a pressure type flow rate control device according to an embodiment of the present invention.

FIG. 10 shows an example of a pressure type flow rate control device 35 including the above-mentioned piezoelectric element driven valve 1. The pressure type flow rate control device 35 includes a piezoelectric element driven valve 1 shown in FIG. 2 (or FIG. 9), a restriction portion 36 (for example, an orifice plate) provided downstream of the piezoelectric element driven valve 1, a pressure sensor 38 for measuring a pressure P of a fluid passage 37 between the piezoelectric element-driven valve 1 and the restriction portion 36, and a control circuit 39 for controlling the piezoelectric element driven valve 1, wherein the control circuit 39 calculates the flow rate passing through the restriction portion 36 based on the detected pressure P upstream of the restriction portion 36, and controls the flow rate passing through the restriction portion 36 by controlling the open and close of the piezoelectric element driven valve 1.

Since the pressure type flow rate control device 35 includes a piezoelectric element driven valve 1 capable of obtaining a large flow rate, it is possible to control a fluid having a large flow rate with high accuracy.

Figure 11:
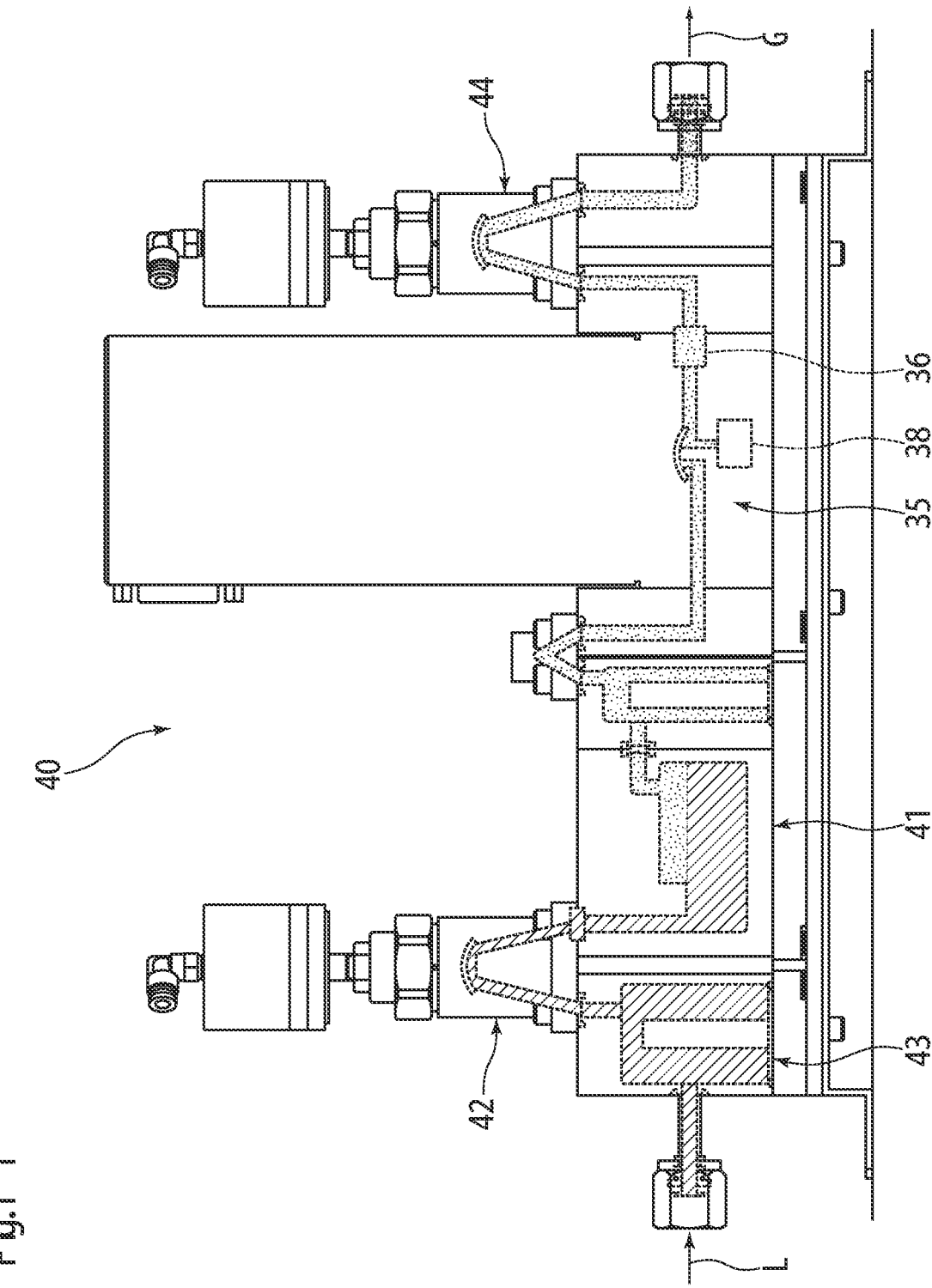
FIG. 11 is a schematic front view showing an example of a vaporization supply apparatus according to an embodiment of the present invention.
Figure 12:
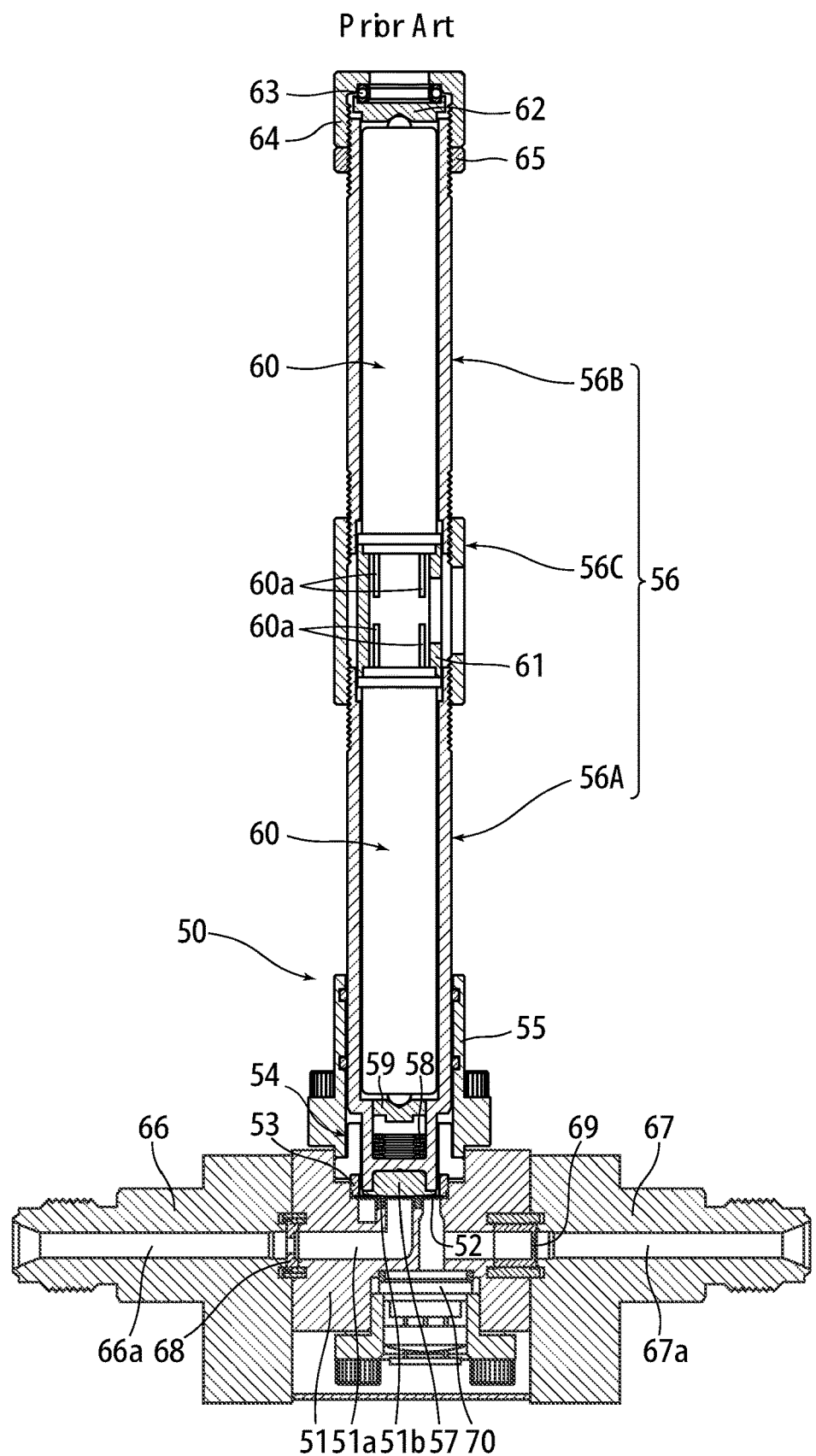
FIG. 12 is a cross-sectional view of a flow rate control device including a conventional piezoelectric element driven valve.

FIG. 11 shows an example of a vaporization supply apparatus 40 provided with a pressure type flow rate control device 35 shown in FIG. 10. The vaporization supply apparatus 40 includes a pressure type flow rate control device 35 shown in FIG. 10, a vaporizer 41 provided upstream of the pressure type flow rate control device 35 for vaporizing a liquid raw material L, a supply means 42 (e.g., an air-driven control valve for controlling the supply amount of the liquid raw material L to be vaporized) for supplying the liquid raw material L to the vaporizer 41, a preheating section 43 provided upstream of the vaporizer 41 for pre-heating the liquid raw material L supplied to the vaporizer 41, a stop valve 44 (e.g., a known air-driven valve or a solenoid valve) provided downstream of the pressure type flow rate control device 35 for blocking the flow of the vaporized gas G as required, a plurality of heaters (not shown) for independently heating the preheating section 43, the vaporizer 41, and the pressure type flow rate control device 35, wherein the liquid raw material L is pre-heated by the pre-heating section 43, the pre-heated liquid raw material L is supplied to the vaporizer 41 by the supply means 42 to be vaporized by the vaporizer 41, and the flow rate of the generated gas G is controlled by the pressure type flow rate control device 35.

In FIG. 11, the portion filled with the liquid raw material is indicated by hatching with oblique lines, and the portion through which the gas flows is indicated by hatching with dots.

Since the vaporization supply apparatus 40 includes the pressure type flow rate control device 35 capable of controlling the gas G of a large flow rate with high accuracy, the vaporizer 41 for vaporizing the liquid raw material L and supplying the liquid raw material L to the pressure type flow rate control device 35, and the supply means 42 for supplying the liquid raw material L to the vaporizer 41, the gas G of a large flow rate can be supplied to a semiconductor manufacturing facility or the like.

In addition, in the above embodiment, the flow rate control device 2 is configured by combining the piezoelectric element driven valve 1 with the pressure control valve 4, or the restriction portion 6, and the like, but in other embodiments, the piezoelectric element driven valve 1 may be used alone to configure a high-speed servo type flow rate control device.

Further, in the above embodiment, the piezoelectric element driven valve 1 has a structure including two or three piezoelectric actuators 23A, 23B, and 23C stacked in two or three stages, but in other embodiments, the piezoelectric element driven valve 1 may have a structure including four or more piezoelectric actuators 23A, 23B, 23C, . . . stacked in four or more stages.

Moreover, in the above embodiment, the piezoelectric element driven valve 1 was a piezoelectric element driven valve 1 of the normally closed type, in other embodiments, the piezoelectric element driven valve 1 may be a piezoelectric element driven valve 1 of the normally open type.

Furthermore, in the above embodiment, the piezoelectric actuators 23A, 23B, and 23C having the same length, same shape, and same performance are stacked, but the piezoelectric actuators 23B, 23C stacked in the upper stage do not necessarily have to be the same as the piezoelectric actuator 23A in the lower stage, and the piezoelectric actuators 23B . . . having a shape and performance different from that of the piezoelectric actuator 23A in the lower stage may be stacked. At this time, if the length and diameter of the upper piezoelectric actuators 23B, . . . are different from that of the lower piezoelectric actuator 23A, for example, any or all of the dimensions of the actuator box 20B, the inner connecting jig 24, and the outer connecting jig 21 may be changed, as long as the structure has an internal thread 21c on the outer connecting jig 21 that can be screwed to an external thread 20d on the lower actuator box 20A. In addition, when the upper-stage piezoelectric actuators 23B, . . . are shorter than the lower-stage piezoelectric actuators 23A, instead of changing the dimensions of the actuator box 20B and the like, a spacer may be added by an amount corresponding to the insufficient length to compensate for the insufficient length. The material of the spacer may vary according to the using state, and the thermal expansion coefficient may be made the same by using, for example, stainless steel or an invar material used in the actuator box, or the heat of the piezoelectric actuator 23A in the lower stage may not be transferred to the piezoelectric actuators 23B in the upper stage by using a heat insulating material as the material of the spacer, or by forming a shape such that heat can be radiated from the spacer.

Further, in the above embodiment, the conical receiving groove 24e in the upper portion of the inner connecting jig 24 is provided for positioning the semicircular displacement portion 23d of the piezoelectric actuators 23B, . . . but any shape may be used as long as the piezoelectric actuators 23B can be positioned, for example, a hole capable of accommodating the semicircular displacement portion 23d may be used, or it may be a structure in which a hole having an inner diameter substantially the same as the outer diameter of the piezoelectric actuator 23B is formed, and the piezoelectric actuator 23B is fitted into the hole formed on the inner connecting jig 24 together with the semicircular displacement portion 23d.

DESCRIPTION OF NUMERALS 1 piezoelectric element driven valve
11 main body
11a fluid passage
11b valve seat
16 valve element
20A, 20B, 20C actuator boxes
23A, 23B, 23C piezoelectric actuators
23c terminal
23d hemispherical displacement portion
21 outer connecting jig
21f engaging surface
21e opening
24 inner connecting jig
24e opening
24c O-ring groove
24e conical receiving groove
34 O-ring
35 pressure type flow rate control device
36 restriction portion.
37 fluid passage
38 pressure sensor
40 vaporization supply apparatus
41 vaporizer
42 supply means
G gas
L liquid raw material

The invention claimed is:

1. A piezoelectric element driven valve comprising:
a main body having a fluid passage and a valve seat;
a valve element seated on and off the valve seat for opening and closing the fluid passage;
a piezoelectric actuator for driving the opening and closing of the valve element by using an extension of a piezoelectric element;
a plurality of actuator boxes formed in a cylindrical shape, provided on the main body, and arranged in series;
an outer connecting jig formed in a cylindrical shape, provided between the actuator boxes adjacent to each other, having an opening capable of drawing out wiring, and detachably connecting the actuator boxes adjacent to each other;
a plurality of piezoelectric actuators accommodated in a same direction respectively in each of the actuator boxes and arranged in a series, wherein a distal end portion faces toward the valve element and a proximal end portion provided with a terminal faces an opposite side of a distal end portion;
an inner connecting jig formed in a cylindrical shape, having an opening capable of drawing out wiring, and slidably accommodated in the outer connecting jig, for positioning the proximal end portion and the distal end portion of the piezoelectric actuator adjacent to each other, wherein
an end portion of the inner connecting jig is closed, and a conical receiving groove is positioned in a central portion of a closed outer surface of the end portion of the inner connecting jig for fitting a hemispherical displacement portion provided in the distal end portion of the piezoelectric actuator in a positioned state.

2. The piezoelectric element driven valve according to claim 1, wherein the inner connecting jig is slidably supported on an inner peripheral surface of the outer connecting jig via a plurality of O-rings.

3. The piezoelectric element driven valve according to claim 2, wherein a plurality of annular O-ring grooves for fitting the O-rings are formed in at least one of the outer peripheral surface of the inner connection jig and the inner peripheral surface of the outer connection jig, and the O-rings are respectively fitted in the O-ring grooves.

4. The piezoelectric element driven valve according to claim 1, wherein both end portions of the outer connecting jig are detachably screwed to end portions of the actuator boxes adjacent thereto, and an outer peripheral surface of the outer connecting jig is provided with a parallel engaging surface engaged by a wrench.

5. The piezoelectric element driven valve according to claim 1, wherein the outer connecting jig has a plurality of openings in the circumferential direction for drawing out wiring.

6. The piezoelectric element driven valve according to claim 1, wherein the inner connecting jig has a plurality of openings in the circumferential direction for drawing out wiring.

7. The piezoelectric element driven valve according to claim 1, wherein the plurality of the piezoelectric actuators is driven at a same applied voltage by connecting wiring in parallel.

8. A pressure type flow rate control device comprising:
the piezoelectric element driven valve according to claim 1;
a restriction portion provided downstream of the piezoelectric element driven valve; and
a pressure sensor for measuring a pressure of the fluid passage between the piezoelectric element driven valve and the restriction portion, wherein
the flow rate is controlled on the basis of a detected pressure from the pressure sensor.

9. A vaporization supply apparatus comprising:
the pressure type flow rate control device according to claim 8;
a vaporizer provided upstream of the pressure type flow rate control device for vaporizing a liquid raw material; and
a supply means for supplying the liquid raw material to be vaporized to the vaporizer, wherein
the supply means supplies the liquid raw material into the vaporizer, and the gas vaporized by the vaporizer is supplied downstream while the flow rate is controlled by the pressure type flow rate control device.

10. The vaporizer supply apparatus according to claim 9, wherein the supply means includes a control valve for controlling the supply of the liquid raw material to the vaporizer.

* * * * *